United States Patent
Okada et al.

(10) Patent No.: US 7,490,529 B2
(45) Date of Patent: Feb. 17, 2009

(54) GEAR FOR TRANSMISSION AND METHOD FOR MANUFACTURING THE SAME

(75) Inventors: Tomoyoshi Okada, Nayoya (JP); Mitsushige Ooka, Nagoya (JP); Junichi Ooka, Nagoya (JP)

(73) Assignee: O-Oka Corporation, Toyota-shi (JP)

( * ) Notice: Subject to any disclaimer, the term of this patent is extended or adjusted under 35 U.S.C. 154(b) by 579 days.

(21) Appl. No.: 10/834,922

(22) Filed: Apr. 30, 2004

(65) Prior Publication Data

US 2005/0016309 A1    Jan. 27, 2005

(30) Foreign Application Priority Data

May 2, 2003    (JP) .............................. 2003-127620

(51) Int. Cl.
*F16D 23/06*    (2006.01)
(52) U.S. Cl. .................. 74/434; 192/108; 192/53.1
(58) Field of Classification Search ................ 74/434, 74/437, 438, 460; 192/108, 53.1
See application file for complete search history.

(56) References Cited

U.S. PATENT DOCUMENTS 3,366,208 A * 1/1968 Kelbel .................. 192/53.343
4,687,081 A * 8/1987 Osterloff et al. .......... 192/53.32
4,938,089 A    7/1990 Ohoka

FOREIGN PATENT DOCUMENTS

EP    0 949 435    * 10/1999
EP    1 219 847    7/2002

OTHER PUBLICATIONS

Patent Abstracts of Japan, JP 01-180748, Jul. 18, 1989.
Patent Abstracts of Japan, JP 59-208265, Nov. 26, 1984.
Patent Abstracts of Japan, JP 2001-219241, Aug. 14, 2001.
Patent Abstracts of Japan, JP 09-257053, Sep. 30, 1997.

* cited by examiner

*Primary Examiner*—William C Joyce
(74) *Attorney, Agent, or Firm*—Oblon, Spivak, McClelland, Maier & Neustadt, P.C.

(57) ABSTRACT

A method for manufacturing a gear and a gear for a transmission, in which an outer peripheral gear part formed on an outer peripheral wall surface of a main body of a gear, an annularly-shaped concave portion annularly formed at a radial inner part on at least one axial end surface of the main body of the gear within the outer peripheral gear part thereof, a dog gear part formed on an outside peripheral wall surface at a central part formed on the annularly-shaped concave portion, and a taper part comprising an inner corn for being synchro formed on an inside peripheral wall surface formed on the annularly-shaped concave portion, are formed integrally by forging.

14 Claims, 7 Drawing Sheets

FIG. 2A MATERIAL
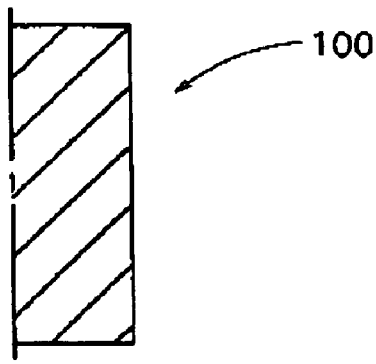
FIG. 2B HOT FORGING
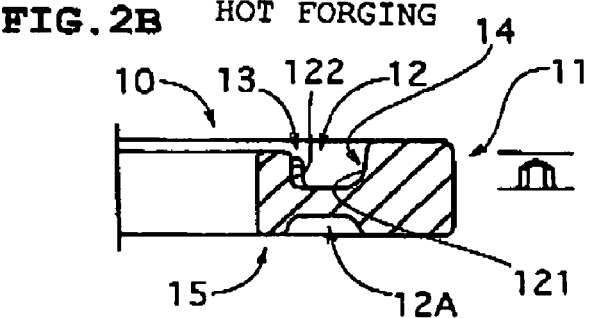
FIG. 2C FIRST COLD FORGING
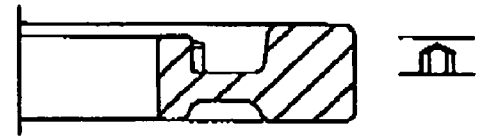
FIG. 2D SECOND COLD FORGING
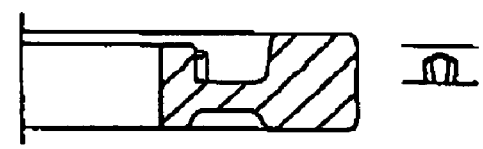
FIG. 2E CUTTING PROCESS
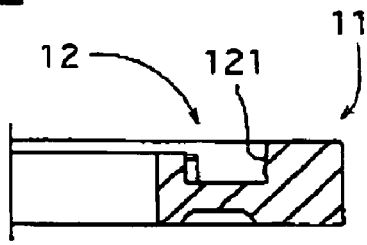
FIG. 2F GEAR CUTTING
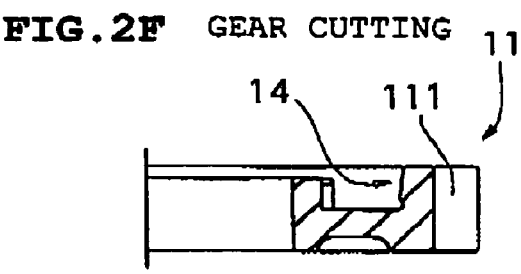
FIG. 2G HEAT-TREATMENT
FIG. 2H TAPERING PROCESS
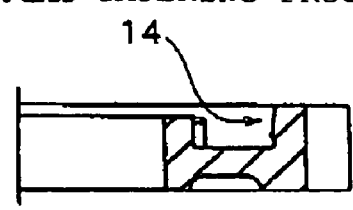

FIG. 7A MATERIAL
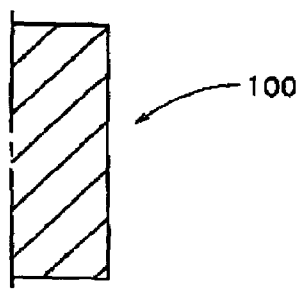
FIG. 7B HOT FORGING
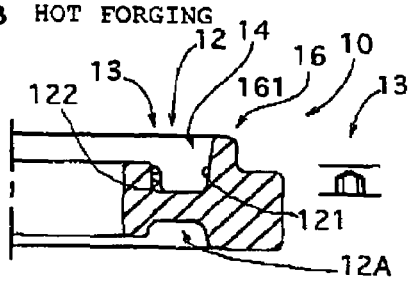
FIG. 7C FIRST COLD FORGING
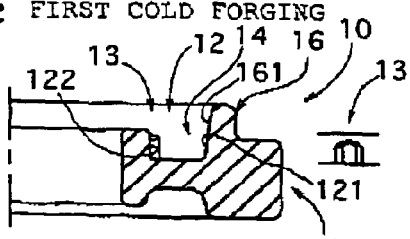
FIG. 7D SECOND COLD FORGING
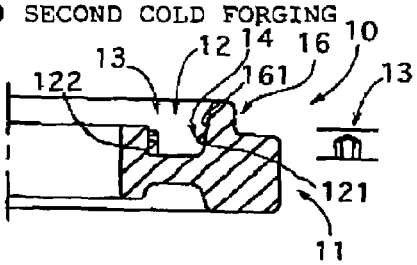
FIG. 7E CUTTING PROCESS
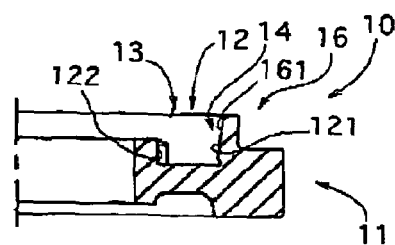
FIG. 7F GEAR CUTTING
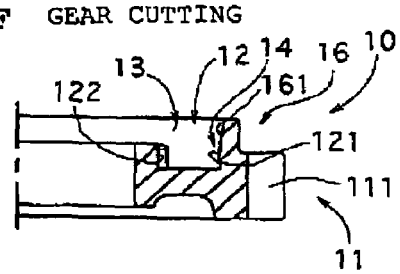
FIG. 7G HEAT-TREATMENT
FIG. 7H TAPERING FINISHING PROCESS
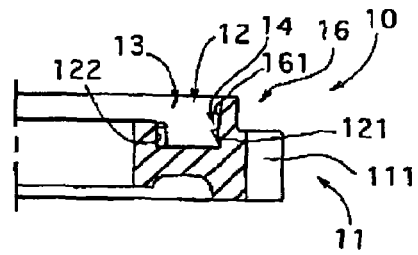

FIG. 9A MATERIAL
FIG. 9B HOT FORGING
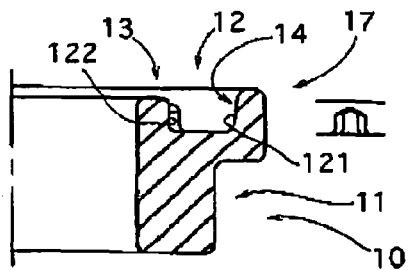
FIG. 9C FIRST COLD FORGING
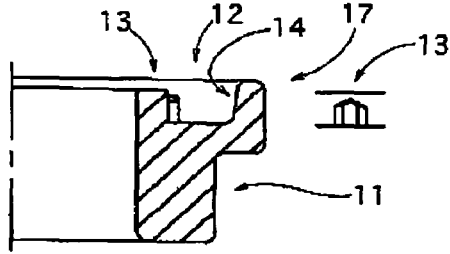
FIG. 9D SECOND COLD FORGING
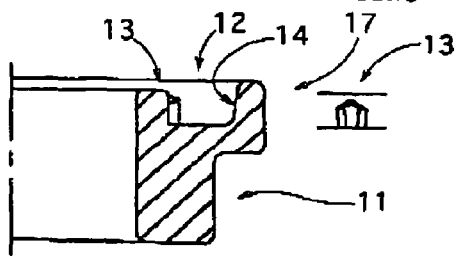
FIG. 9E CUTTING PROCESS
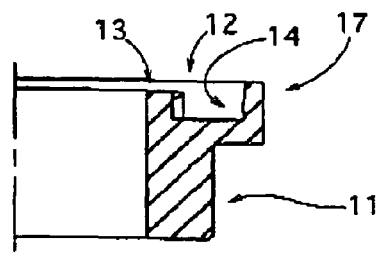
FIG. 9F GEAR CUTTING
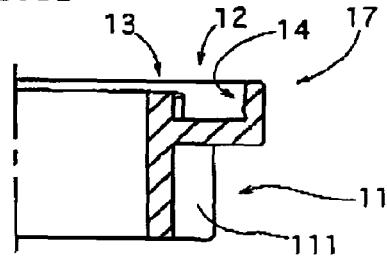
FIG. 9G HEAT-TREATMENT
FIG. 9H TAPERING FINISHING PROCESS
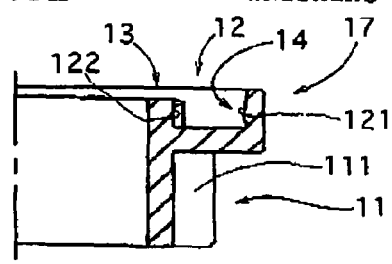

CUTTING PROCESS

GEAR FOR TRANSMISSION AND METHOD FOR MANUFACTURING THE SAME

BACKGROUND OF THE INVENTION

1. Field of the Invention

The present invention relates to a gear for a transmission for automobiles especially for passenger vehicles and a method for manufacturing the same.

2. Description of the Prior Art

A self biasing type synchro device essential for a heavy truck, was provided in a conventional transmission provided with a pin type synchro device. There was no description in processing method, however, it is apparent that a material was formed to an annularly-shaped gear matrix by hot forging because a size of a gear is large. Each part of the gear was molded by cutting process and chamfering process, and a gear cutting process and finishing process were carried out after the cutting process (for example, refer to a patent document JP10-103376A (pp. 1-6, FIGS. 1-6).

SUMMARY OF THE INVENTION

In the above described conventional transmission provided with a pin type synchro device, there are many problems such that a steady intensity could not be accomplished because each part of a gear was molded by cutting process, and the cost was relatively high because of the difficult cutting process and the manufacturing method was complicated, and there are restrictions in designs of each part of a gear because of a restriction of a cutting process.

It is a general object of the present invention to provide a gear for a transmission for automobiles especially for passenger vehicles and a method for manufacturing the same having advantages such that it is able to attain a stable intensity, simplify the manufacturing method and lower costs because there is no need to handle a difficult cutting process and it eliminates restrictions on the design of the each part of the gear because there is no restriction on cutting process.

It is a more specific object of the present invention to provide a gear for a transmission for automobiles especially for passenger vehicles and a method for manufacturing the same, in which an outer peripheral gear part formed on an outer peripheral surface of a main body of a gear, an annularly-shaped concave portion annularly formed at a radial inner part on at least one axial end surface of the main body of the gear within the outer peripheral gear part thereof, a dog gear part formed on an outer peripheral wall surface at a central part formed on the annularly-shaped concave portion and a taper part comprising an inner corn for a synchro (defined in the transmission industry as being a synchronizer ring as mentioned, for example, in U.S. Pat. No. 5,582,281, column 1, lines 6-11), formed on an inside peripheral wall surface formed on the annularly-shaped concave portion are integrally formed by forging.

It is a general object of the present invention to provide a gear for a transmission for automobiles especially for passenger vehicles and a method for manufacturing the same having advantages such that it is able to attain stable intensity, simplify the manufacturing method and lower costs because there is no need to handle difficult cutting process and it is able to eliminate restrictions on the design of the each part of the gear because there is no restriction on the cutting process.

It is a more specific object of the present invention to provide a gear for a transmission for automobiles especially for passenger vehicles and a method for manufacturing the same in which an outer peripheral gear part formed on an outer peripheral wall surface of a main body of a gear, an annularly-shaped concave portion annularly formed at a radial inner part on at least one axial end surface of the main body of the gear within the outer peripheral gear part thereof, a dog gear part formed on an outer peripheral wall surface at a central part formed on the annularly-shaped concave portion and a taper part comprising an inner corn for a synchro or synchronizer ring, formed on an inside peripheral wall surface formed on the annularly-shaped concave portion are integrally formed by forging.

It is an another object of the present invention to provide a method for manufacturing a gear for a transmission in which an outer peripheral gear part formed on an outer peripheral wall surface of a main body of a gear, an annularly-shaped concave portion annularly formed at a radial inner part on at least one axial end surface of the main body of the gear, within the outer peripheral gear part thereof, a dog gear part formed on an outside peripheral wall surface at a central part formed on the annularly-shaped concave portion, and a taper part comprising an inner corn for a synchro or synchronizer ring, formed on an inside peripheral wall surface formed on the annularly-shaped concave portion are formed integrally by forging.

It is a still another object of the present invention to provide a method for manufacturing a gear for a transmission in which an outer peripheral gear part formed on an outer peripheral surface of a main body of a gear, an annularly-shaped concave portion annularly formed at a radial inner part on at least one axial end surface of the main body of the gear within the outer peripheral gear part thereof, an annularly-shaped projected portion projected in an axial direction in order to form an inside peripheral wall surface for extending an inside peripheral wall surface provided at an outer peripheral side thereof, on the annularly-shaped concave portion, a dog gear part formed on an outside peripheral wall surface at a central part formed on the annularly-shaped concave portion, and a taper part comprising an inner corn for a synchro or synchronizer ring, formed on an inside peripheral wall surface formed on the annularly-shaped concave portion and on an inside peripheral wall surface of the annularly-shaped projected portion are formed integrally by forging.

It is a further object of the present invention to provide a method for manufacturing a gear for a transmission in which an outer peripheral gear part formed on a part formed on an axial direction of an outer peripheral surface of a main body of a gear; a large diameter portion having a larger diameter than that of the outer peripheral gear part formed on an outer peripheral surface of the main body of the gear, an annularly-shaped concave portion annularly formed at a radial inner part of the large diameter portion within an outer peripheral part on an axial end surface of the large diameter portion, a dog gear part formed on an outside peripheral wall surface at a central part formed on the annularly-shaped concave portion, and a taper part comprising an inner corn for a synchro or synchronizer ring, formed on an inside peripheral wall surface formed on the annularly-shaped concave portion are integrally formed by forging.

It is a still further object of the present invention to provide a method for manufacturing a gear for a transmission in which the outer peripheral gear part, the annularly-shaped concave portion, the dog gear part formed on an outside peripheral wall surface at a central part formed on the annularly-shaped concave portion and the taper part are integrally formed by molding a material in hot forging.

It is a yet further object of the present invention to provide a method for manufacturing a gear for a transmission in which a form of a tooth part of the dog gear part is formed as a back taper form so as to spread a thickness of the tooth part from a base end of a bottom wall surface of the annularly-shaped concave portion to an tip end part thereof by cold forging.

It is a yet further object of the present invention to provide a method for manufacturing a gear for a transmission in which the tip end part of the tooth part of the dog gear part is formed as an angle chamfer form by cold forging.

It is an another object of the present invention to provide a method for manufacturing a gear for a transmission in which the outer peripheral gear is formed on the outer peripheral gear part thereof by gear cutting.

It is a still another object of the present invention to provide a method for manufacturing a gear for a transmission in which the main body of the gear having the outer peripheral gear part formed thereon is heat-treated.

It is a further object of the present invention to provide a method for manufacturing a gear for a transmission in which a taper friction surface is formed by finishing the taper part of the heat-treated main body of the gear.

It is a still further object of the present invention to provide a method for manufacturing a gear for a transmission in which radial grooves for lubrication formed in an axial direction and at an each pre-determined angle of circumference on the taper part are formed by forging process.

It is a yet further object of the present invention to provide a gear for a transmission which comprises an outer peripheral gear part formed on an outer peripheral wall surface of a main body of a gear, an annularly-shaped concave portion annularly formed at a radial inner part on at least one axial end surface of the main body of the gear, within the outer peripheral gear part thereof, a dog gear part formed on an outside peripheral wall surface at a central part formed on the annularly-shaped concave portion, and a taper part comprising an inner corn for a synchro or synchronizer ring, formed on an inside peripheral wall surface formed on the annularly-shaped concave portion, which are formed integrally by forging.

It is a yet further object of the present invention to provide a gear for a transmission which comprises an outer peripheral gear part formed on an outer peripheral surface of a main body of a gear; an annularly-shaped concave portion annularly formed at a radial inner part on at least one axial end surface of the main body of the gear within the outer peripheral gear part thereof; an annularly-shaped projected portion projected in an axial direction in order to form an inside peripheral wall surface for extending an inside peripheral wall surface provided at an outer peripheral side thereof, on the annularly-shaped concave portion; a dog gear part formed on an outside peripheral wall surface at a central part formed on the annularly-shaped concave portion; and a taper part comprising an inner corn for a synchro or synchronizer ring, formed on an inside peripheral wall surface formed on the annularly-shaped concave portion and on an inside peripheral wall surface of the annularly-shaped projected portion, which are formed integrally by forging.

It is an another object of the present invention to provide a gear for a transmission which comprises an outer peripheral gear part formed on a part formed on an axial direction of an outer peripheral surface of a main body of a gear; a large diameter portion having a larger diameter than that of the outer peripheral gear part formed on an outer peripheral surface of the main body of the gear; an annularly-shaped concave portion annularly formed at a radial inner part of the large diameter portion within an outer peripheral part on an axial end surface of the large diameter portion; a dog gear part formed on an outside peripheral wall surface at a central part formed on the annularly-shaped concave portion; and a taper part comprising an inner corn for a synchro or synchronizer ring, formed on an inside peripheral wall surface formed on the annularly-shaped concave portion, which are integrally formed by forging.

It is a still another object of the present invention to provide a gear for a transmission in which a form of a tooth part of the dog gear part is formed as a back taper form so as to spread a thickness of the tooth part from a base end of a bottom wall surface of the annularly-shaped concave portion to an tip end part thereof.

It is a further object of the present invention to provide a gear for a transmission in which the tip end part of the tooth part of the dog gear part is formed as an angle chamfer form.

It is a still further object of the present invention to provide a gear for a transmission in which the taper part is formed on more than half of an inside peripheral wall surface of the annularly-shaped concave portion.

It is a yet further object of the present invention to provide a gear for a transmission in which the taper part is formed on an inside peripheral wall surface of the annularly-shaped projecting concave portion and an inside peripheral wall surface comprising the annularly-shaped concave portion.

It is a yet further object of the present invention to provide a gear for a transmission in which an axial end part of an outer peripheral side part of the main body of the gear projects more than an axial end surface of a central side part of the main body of the gear.

It is an another object of the present invention to provide a gear for a transmission in which radial grooves for lubrication formed in an axial direction and at an each pre-determined angle of circumference on the taper part are formed by forging process.

In the method for manufacturing a gear for a transmission according to the present invention having the above described construction, an outer peripheral gear part formed on an outer peripheral wall surface of a main body of a gear; an annularly-shaped concave portion annularly formed at a radial inner part on at least one axial end surface of the main body of the gear, within the outer peripheral gear part thereof; a dog gear part formed on an outside peripheral wall surface at a central part formed on the annularly-shaped concave portion; and a taper part comprising an inner corn for a synchro or synchronizer ring, formed on an inside peripheral wall surface formed on the annularly-shaped concave portion are formed integrally by forging.

Therefore, the method for manufacturing the gear for a transmission according to the present invention has an advantage such that it is able to attain stable intensity of the gear for a transmission, simplify the method for manufacturing the gear for a transmission and lower costs because there is no need to handle difficult cutting process. Moreover, the gear for a transmission according to the present invention has an advantage such that it is able to eliminate restrictions on the design of the each part of the gear because there is no restriction on cutting process.

In the method for manufacturing a gear for a transmission according to the present invention having the above described construction, an outer peripheral gear part formed on an outer peripheral surface of a main body of a gear; an annularly-shaped concave portion annularly formed at a radial inner part on at least one axial end surface of the main body of the gear within the outer peripheral gear part thereof; an annularly-shaped projected portion projected in an axial direction in order to form an inside peripheral wall surface for extending an inside peripheral wall surface provided at an outer peripheral side thereof, on the annularly-shaped concave portion; a dog gear part formed on an outside peripheral wall surface at a central part formed on the annularly-shaped concave portion; and a taper part comprising an inner corn for a synchro or synchronizer ring, formed on an inside peripheral wall surface formed on the annularly-shaped concave portion and on an inside peripheral wall surface of the annularly-shaped projected portion are formed integrally by forging.

Therefore, the method for manufacturing the gear for a transmission according to the present invention has an advantage such that it is able to attain stable intensity of the gear for a transmission, simplify the method for manufacturing the gear for a transmission and lower costs because there is no need to handle difficult cutting process. Moreover, the gear for a transmission according to the present invention has an advantage such that it is able to eliminate restrictions on the design of the each part of the gear because there is no restriction on cutting process.

In the method for manufacturing a gear for a transmission according to the present invention having the above described construction, an outer peripheral gear part formed on a part formed on an axial direction of an outer peripheral surface of a main body of a gear; a large diameter portion having a larger diameter than that of the outer peripheral gear part formed on an outer peripheral surface of the main body of the gear; an annularly-shaped concave portion annularly formed at a radial inner part of the large diameter portion within an outer peripheral part on an axial end surface of the large diameter portion; a dog gear part formed on an outside peripheral wall surface at a central part formed on the annularly-shaped concave portion, and a taper part comprising an inner corn for a synchro or synchronizer ring, formed on an inside peripheral wall surface formed on the annularly-shaped concave portion are integrally formed by forging.

Therefore, the method for manufacturing the gear for a transmission according to the present invention has an advantage such that it is able to attain stable intensity of the gear for a transmission, simplify the method for manufacturing the gear for a transmission and lower costs because there is no need to handle difficult cutting process. Moreover, the gear for a transmission according to the present invention has an advantage such that it is able to eliminate restrictions on the design of the each part of the gear because there is no restriction on cutting process.

In the method for manufacturing a gear for a transmission according to the present invention having the above described construction, the outer peripheral gear part, the annularly-shaped concave portion, the dog gear part formed on an outside peripheral wall surface at a central part formed on the annularly-shaped concave portion and the taper part are integrally formed by molding a material in hot forging.

Therefore, the method for manufacturing the gear for a transmission according to the present invention has an advantage such that it is able to attain stable intensity of the gear for a transmission, simplify the method for manufacturing the gear for a transmission and lower costs because there is no need to handle difficult cutting process.

In the method for manufacturing a gear for a transmission according to the present invention having the above described construction, a form of a tooth part of the dog gear part is formed as a back taper form so as to spread a thickness of the tooth part from a base end of a bottom wall surface of the annularly-shaped concave portion to an tip end part thereof by cold forging.

Therefore, the method for manufacturing the gear for a transmission according to the present invention has an advantage such that it is able to attain accuracy of the back taper form.

In the method for manufacturing a gear for a transmission according to the present invention having the above described construction, the tip end part of the tooth part of the dog gear part is formed as an angle chamfer form by cold forging.

Therefore, the method for manufacturing the gear for a transmission according to the present invention has an advantage such that it is able to attain accuracy of the angle chamfer form.

In the method for manufacturing a gear for a transmission according to the present invention having the above described construction, the outer peripheral gear is formed on the outer peripheral gear part thereof by gear cutting.

Therefore, the method for manufacturing the gear for a transmission according to the present invention has an advantage such that it is able to form a desired outer peripheral gear.

In the method for manufacturing a gear for a transmission according to the present invention having the above described construction, the main body of the gear having the outer peripheral gear part formed thereon is heat-treated.

Therefore, the method for manufacturing the gear for a transmission according to the present invention has an advantage such that intensity of the gear for a transmission can be enhanced.

In the method for manufacturing a gear for a transmission according to the present invention having the above described construction, a taper friction surface is formed by finishing the taper part of the heat-treated main body of the gear.

Therefore, the method for manufacturing the gear for a transmission according to the present invention has an advantage such that it is able to form the taper friction surface having a desired finished accuracy.

In the method for manufacturing a gear for a transmission according to the present invention having the above described construction, radial grooves for lubrication formed in an axial direction and at an each pre-determined angle of circumference on the taper part are formed by forging process.

Therefore, the method for manufacturing the gear for a transmission according to the present invention has an advantage such that the radial grooves for lubrication can be formed without cutting process and there is no need to handle finishing process.

In the gear for a transmission according to the present invention having the above described construction, an outer peripheral gear part formed on an outer peripheral wall surface of a main body of a gear, an annularly-shaped concave portion annularly formed at a radial inner part on at least one axial end surface of the main body of the gear, within the outer peripheral gear part thereof, a dog gear part formed on an outside peripheral wall surface at a central part formed on the annularly-shaped concave portion, and a taper part comprising an inner corn for a synchro or synchronizer ring, formed on an inside peripheral wall surface formed on the annularly-shaped concave portion are formed integrally by forging.

Therefore, the gear for a transmission according to the present invention has an advantage such that it is able to attain stable intensity of the gear for a transmission and lower costs because there is no need to handle difficult cutting process. Moreover, the gear for a transmission according to the present invention has an advantage such that it is able to eliminate restrictions on the design of the each part of the gear because there is no restriction on cutting process and it is able to shorten the axial length of the transmission and attain downsizing because the axial length is short.

In the gear for a transmission according to the present invention having the above described construction, an outer peripheral gear part formed on an outer peripheral surface of a main body of a gear; an annularly-shaped concave portion annularly formed at a radial inner part on at least one axial end surface of the main body of the gear within the outer peripheral gear part thereof; an annularly-shaped projected portion projected in an axial direction in order to form an inside peripheral wall surface for extending an inside peripheral wall surface provided at an outer peripheral side thereof, on the annularly-shaped concave portion; a dog gear part formed on an outside peripheral wall surface at a central part formed on the annularly-shaped concave portion; and a taper part comprising an inner corn for a synchro or synchronizer ring, formed on an inside peripheral wall surface formed on the annularly-shaped concave portion and on an inside peripheral wall surface of the annularly-shaped projected portion are formed integrally by forging.

Therefore, the gear for a transmission according to the present invention has an advantage such that it is able to attain stable intensity of the gear for a transmission, simplify the method for manufacturing the gear for a transmission and lower costs because there is no need to handle difficult cutting process. Moreover, the gear for a transmission according to the present invention has an advantage such that it is able to eliminate restrictions on the design of the each part of the gear because there is no restriction on cutting process.

Furthermore, the gear for a transmission according to the present invention has an advantage such that it is able to secure a desired pressurized area and upgrade a torque capacity because the taper part comprising the inner corn for a synchro or synchronizer ring, is formed on the inside peripheral wall surface of the annularly-shaped concave portion and the inner peripheral wall surface formed on the annularly-shaped projected portion.

In the gear for a transmission according to the present invention having the above described construction, an outer peripheral gear part formed on a part formed on an axial direction of an outer peripheral surface of a main body of a gear; a large diameter portion having a larger diameter than that of the outer peripheral gear part formed on an outer peripheral surface of the main body of the gear; an annularly-shaped concave portion annularly formed at a radial inner part of the large diameter portion within an outer peripheral part on an axial end surface of the large diameter portion; a dog gear part formed on an outside peripheral wall surface at a central part formed on the annularly-shaped concave portion; and a taper part comprising an inner corn for a synchro or synchronizer ring, formed on an inside peripheral wall surface formed on the annularly-shaped concave portion are integrally formed by forging.

Therefore, the gear for a transmission according to the present invention has an advantage such that it is able to attain stable intensity of the gear for a transmission, simplify the method for manufacturing the gear for a transmission and lower costs because there is no need to handle difficult cutting process. Moreover, the gear for a transmission according to the present invention has an advantage such that it is able to eliminate restrictions on the design of the each part of the gear because there is no restriction on cutting process.

Furthermore, the gear for a transmission according to the present invention has an advantage such that it is able to upgrade the torque capacity because the taper part comprising the inner corn for a synchro or synchronizer ring, formed on the inside peripheral wall surface formed on the annularly-shaped concave portion annularly formed at a radial inner part of the large diameter portion within the outer peripheral part on an axial end surface of the large diameter portion is located outer than the outer peripheral gear part 11 in a radial direction.

In the gear for a transmission according to the present invention having the above described construction, a form of a tooth part of the dog gear part is formed as a back taper form so as to spread a thickness of the tooth part from a base end of a bottom wall surface of the annularly-shaped concave portion to an tip end part thereof.

Therefore, the gear for a transmission according to the present invention has an advantage such that it is able to attain accurate action of the dog gear due to the accuracy of the back taper form.

In the gear for a transmission according to the present invention having the above described construction, the tip end part of the tooth part of the dog gear part is formed as an angle chamfer form.

Therefore, the gear for a transmission according to the present invention has an advantage such that it is able to attain accurate action of the dog gear due to the accuracy of the angle chamfer form.

In the gear for a transmission according to the present invention having the above described construction, the taper part is formed on more than half of an inside peripheral wall surface of the annularly-shaped concave portion.

Therefore, the gear for a transmission according to the present invention has an advantage such that it is able to secure a desired torque capacity, because the taper part secures a desired pressurized area.

In the gear for a transmission according to the present invention having the above described construction, the taper part is formed on an inside peripheral wall surface of the annularly-shaped projecting concave portion and an inside peripheral wall surface comprising the annularly-shaped concave portion.

Therefore, the gear for a transmission according to the present invention has an advantage such that it is able to obtain a large pressurized area and upgrade a torque capacity.

In the gear for a transmission according to the present invention having the above described construction, an axial end part of an outer peripheral side part of the main body of the gear projects more than an axial end surface of a central side part of the main body of the gear.

Therefore, the gear for a transmission according to the present invention has an advantage such that it is able to secure an area of the taper part comprising the inner corn for synchro or synchronizer ring, formed on the inner peripheral surface comprising the annularly-shaped concave portion.

In the gear for a transmission according to the present invention having the above described construction, radial grooves for lubrication formed in an axial direction and at an each pre-determined angle of circumference on the taper part are formed by forging process. Therefore, the gear for a transmission according to the present invention has an advantage such that it is able to provide lubrication oil evenly all over the taper part.

BRIEF DESCRIPTION OF THE DRAWINGS

FIGS. 2A-2H are chart diagrams showing the method for manufacturing the gear for a transmission according to the first embodiment;

FIGS. 7A-7H are chart diagrams showing the method for manufacturing the gear for a transmission according to the second embodiment;

FIGS. 9A-9H are chart diagrams showing the method for manufacturing the gear for a transmission according to the third embodiment.

DESCRIPTION OF THE PREFERRED EMBODIMENTS

Figure 1:
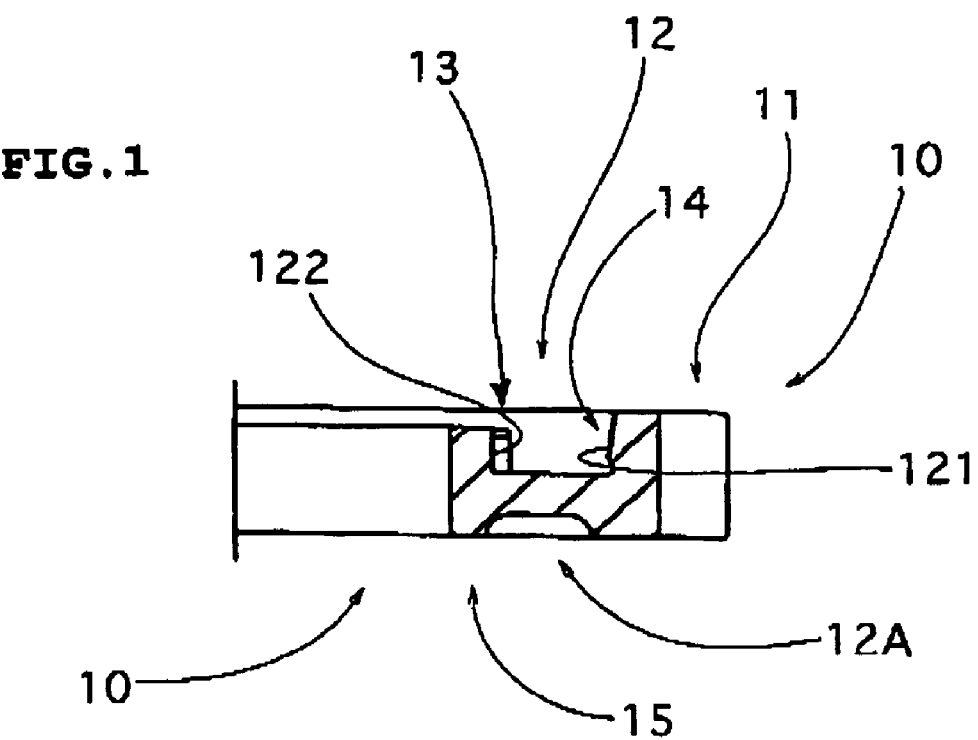
FIG. 1 is a cross section diagram showing half of the gear for a transmission according to the first embodiment of the present invention.

Embodiments of the present invention will now be described with reference to the drawings.

First Embodiment

As shown in FIGS. 1 to 5, a gear for transmission according to the first embodiment of the present invention, comprises an outer peripheral gear part 11 formed on an outer peripheral surface of a main body of a gear 10, annularly-shaped concave portions 12, 12A annularly formed at a radial inner part on one axial end surfaces of the main body of a gear within the outer peripheral gear part 11 thereof, a dog gear part 13 formed on an outside peripheral wall surface 122 at a central part 15 formed on the annularly-shaped concave portion 12 and a taper part 14 comprising an inner corn for a synchro or synchronizer ring, formed on an inside peripheral wall surface 121 formed on the annularly-shaped concave portion 12, which are integrally formed by forging.

In the method for manufacturing a gear for transmission according to the first embodiment, in which an outer peripheral gear part 11 formed on an outer peripheral wall surface of a main body of a gear 10, an annularly-shaped concave portion 12 annularly formed at a radial inner part on at least one axial end surface of the main body of the gear 10 within the outer peripheral gear part thereof, a dog gear part 13 formed on an inside outer peripheral wall surface 122 at a central part 15 formed on the annularly-shaped concave portion 12 and a taper part 14 comprising an inner corn for a synchro or synchronizer ring, formed on an outside inner peripheral wall surface 121 formed on the annularly-shaped concave portion 12, are integrally formed by forging.

Therefore, the outer peripheral gear part 11, the annularly-shaped concave portion 12, the dog gear 13 formed on the outer peripheral surface 122 of the central part 15 comprising the annularly-shaped concave portion 12 and the taper part 14 are integrally formed on the annularly-shaped main body of the gear 10, by hot forging (as shown in FIG. 2B) a solid cylinder material 100 (as shown in FIG. 2A).

Figure 5:
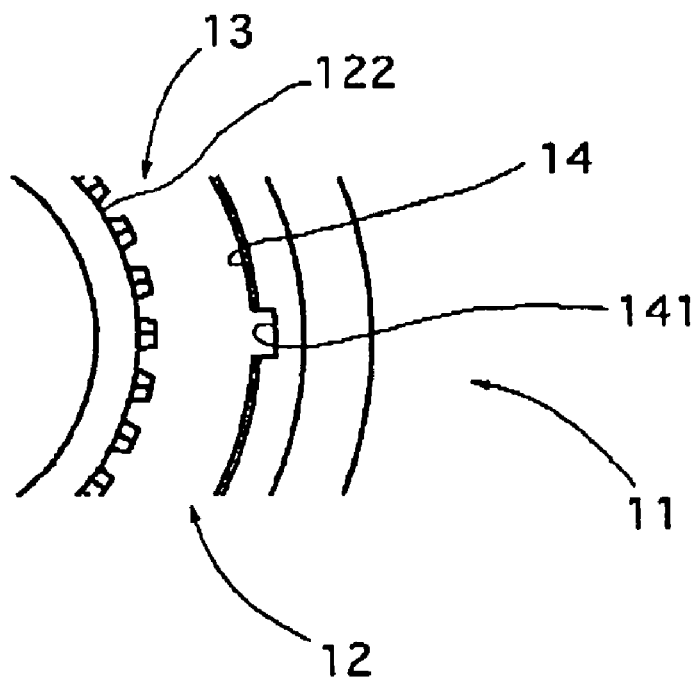
FIG. 5 is a cross section diagram showing the radial grooves formed by hot forging in the manufacturing method according to the first embodiment.

In the above-described hot forging process, as shown in FIG. 5, plurality of grooves 141 for lubrication are formed in radial directions on the taper part 14 at an each pre-determined angle of circumference by concaving a part of the taper part 14 in a radial direction and an axial direction thereof.

As shown in FIG. 2C, a form of gear part of the dog gear part 13 is formed in the first cold forging process. In the second cold forging process as shown in FIG. 2D, the gear part is formed into a back taper form so as to spread the thickness of the tooth part from a base end of the bottom wall surface of the annularly-shaped concave portion 12 to an tip end part thereof, and an end part of a gear part of the dog gear part 13 is formed to an angle chamfer form.

Figure 3A:
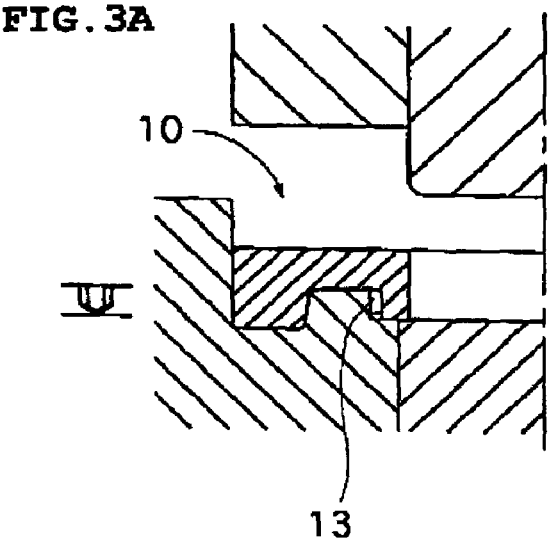
FIGS. 3A-3B are cross section diagrams showing the first cold forging of the manufacturing method according to the first embodiment.
Figure 3B:
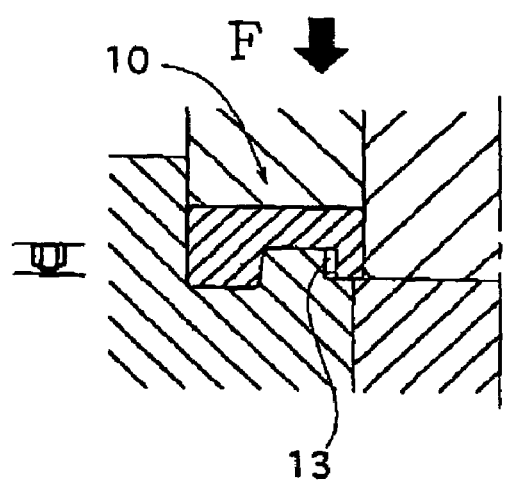

As shown in FIG. 3B, the first cold forging process is carried out by sending down a cope, located upper from a drag, on which the annularly-shaped main body of the gear 10 is located thereon, as shown in FIG. 3A.

Figure 4A:
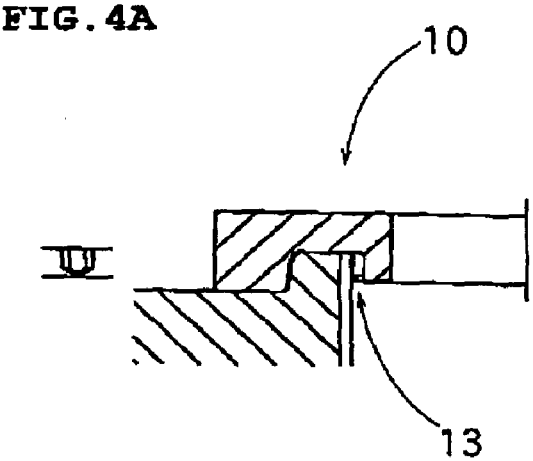
FIGS. 4A-4B are cross section diagrams showing the second cold forging of the manufacturing method according to the first embodiment.
Figure 4B:
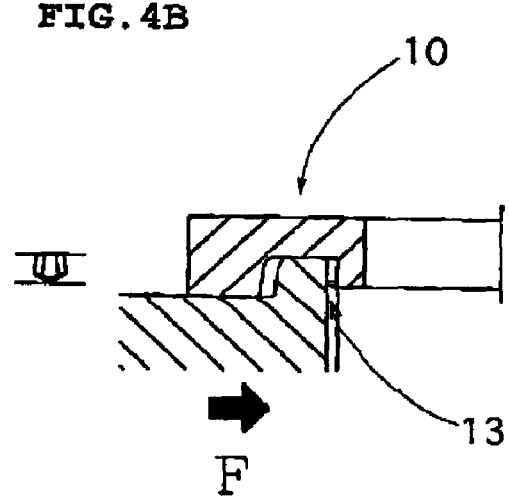

In the second cold forging process, the gear part is formed as to have a back taper form so as to spread the thickness of tooth part from the base end of a bottom wall surface of the annularly-shaped concave portion 12 to the tip end part of the gear part, and the tip end part of the tooth part of the dog gear part 13 is formed as an angle chamfer form by pushing a working tool contacting the dog gear part 13 (as shown in FIG. 4A), into the dog gear part 13 of the annularly-shaped main body of the gear 10 molded in the first cold forging process, into a radial direction, as shown in FIG. 4B.

Axial end parts of each part of the outer peripheral part and central part of the main body of the gear 10 molded in the first and second cold forging processes, are cut and a constant width of the base end of a bottom wall surface of the annularly-shaped concave portion 12 is cut so as to project towards the outer radial direction, as shown in FIG. 2E.

Then an outer peripheral gear 111 is formed on the outer peripheral gear part 11 by gear cutting the main body of the gear 10 molded in the above described cutting process, as shown in FIG. 2F.

The main body of the gear 10, the outer peripheral gear 111 is formed on an outer peripheral surface of the outer peripheral gear part 11 by gear cutting thereon, is carburized as a heat treatment, as shown in FIG. 2G.

The taper part 14 of the heat-treated main body of the gear 10 is finished to form a taper friction surface thereon, as shown in FIG. 2H.

In the method for manufacturing the gear for a transmission according to the first embodiment, the outer peripheral gear part 11 formed on the outer peripheral wall surface of the main body of the gear 10, the annularly-shaped concave portion 12 annularly formed at a radial inner part on at least one axial end surface of the main body of the gear 10 from the outer peripheral gear part 11 thereof, the dog gear part 13 formed on the outside peripheral wall surface 122 at the central part 15 formed on the annularly-shaped concave portion 12 and the taper part 14 comprising the inner corn for a synchro or synchronizer ring, formed on the inside peripheral wall surface 121 formed on the annularly-shaped concave portion 12 are integrally formed by forging. Therefore, the gear for a transmission according to the first invention attains a constant intensity.

In the method for manufacturing the gear for a transmission according to the first embodiment, there is no difficult cutting process. Therefore, the method for manufacturing the gear for a transmission according to the first embodiment has an advantage such that it is able to simplify a manufacturing method and lower costs.

Furthermore, in the method for manufacturing the gear for a transmission according to the first embodiment, there is no restriction of conventional cutting process. Therefore, the method for manufacturing the gear for a transmission according to the first embodiment has an advantage such that it is able to eliminate restrictions on design of each part of the gear.

In the method for manufacturing the gear for a transmission according to the first embodiment, the outer peripheral gear part 11, the annularly-shaped concave portion 12, the dog gear part 13 formed on the outer peripheral wall surface 122 at the central part 15 formed on the annularly-shaped concave portion 12 and the taper part 14 are integrally formed by hot forging materials 100 in bar to the annularly-shaped main body of the gear 10. Therefore, the method for manufacturing the gear for a transmission according to the first embodiment has an advantage such that it is able to make the molding easy and there is no difficult cutting process. Moreover, the method for manufacturing the gear for a transmission according to the first embodiment has an advantage such that it is able to simplify a manufacturing method and lower costs.

In the method for manufacturing the gear for a transmission according to the first embodiment, a form of the tooth part of the dog gear part 13 is formed as a back taper form so as to spread the thickness of the tooth from the base end of the bottom wall surface of the annularly-shaped concave portion 12 to the tip end part thereof by cold forging. Therefore, the method for manufacturing the gear for a transmission according to the first embodiment has an advantage such that it is able to attain accuracy of the back taper form.

In the method for manufacturing the gear for a transmission according to the first embodiment, the tip end part of the tooth part of the dog gear part 13 is formed as an angle chamfer form by cold forging. Therefore, the method for manufacturing the gear for a transmission according to the first embodiment has an advantage such that it is able to attain accuracy of the angle chamfer form.

In the method for manufacturing the gear for a transmission according to the first embodiment, the outer peripheral gear 111 is formed on the outer peripheral gear part 11 thereof by gear cutting. Therefore, the method for manufacturing the gear for a transmission according to the first embodiment has an advantage such that it is able to form a desired outer peripheral gear 111.

In the method for manufacturing the gear for a transmission according to the first embodiment, the main body of the gear 10, having the outer peripheral gear 111 formed thereon is heat-treated. Therefore, the method for manufacturing the gear for a transmission according to the first embodiment has an advantage such that intensity of the gear for a transmission can be enhanced.

In the method for manufacturing the gear for a transmission according to the first embodiment, the taper part 14 of the heat-treated main body of the gear 10 is finished and the taper friction surface is formed. Therefore, the method for manufacturing the gear for a transmission according to the first embodiment has an advantage such that it is able to form the taper friction surface having a desired finished accuracy.

In the method for manufacturing the gear for a transmission according to the first embodiment, the radial grooves 141 for lubrication formed in axial direction and at an each pre-determined angle of circumference on the taper part 14 concaving a part of the taper part 14 by hot forging process. Therefore, the method for manufacturing the gear for a transmission according to the first embodiment has an advantage such that the radial grooves 141 for lubrication can be formed without cutting process and there is no need to handle finishing process.

In the gear for a transmission according to the first embodiment, the outer peripheral gear part 11 formed on an outer peripheral wall surface of the main body of the gear 10, the annularly-shaped concave portion 12 annularly formed at a radial inner part on at least one axial end surface of the main body of the gear 10 within the outer peripheral gear part 11 thereof, the dog gear part 13 formed on the outer peripheral wall surface 122 at the central part 15 formed on the annularly-shaped concave portion 12 and the taper part 14 comprising the inner corn for a synchro or synchronizer ring, formed on the inner peripheral wall surface 121 formed on the annularly-shaped concave portion 12, are integrally formed by forging. Therefore, the gear for a transmission according to the first embodiment has an advantage such that it is able to attain stable intensity of the gear for a transmission and lower costs because there is no need to handle difficult cutting process. Moreover, the gear for a transmission according to the first embodiment has an advantage such that it is able to eliminate restrictions on the design of the each part of the gear because there is no restriction on cutting process and it is able to shorten the axial length of the transmission and attain weight saving and downsizing because the axial length is short.

In the gear for a transmission according to the first embodiment, the form of the tooth part of the dog gear part 13 is formed as the back taper form so as to spread the thickness of the tooth part from the base end of the bottom wall surface of the annularly-shaped concave portion 12 to the tip end part thereof. Therefore, the gear for a transmission according to the first embodiment has an advantage such that it is able to prevent the gear parts from working off from each other owing to the accurate back taper form.

In the gear for a transmission according to the first embodiment, the tip end part of the gear part of the dog gear part 13 is formed as an angle chamfer form. Therefore, the gear for a transmission according to the first embodiment has an advantage such that it is able to make easy to introduce to an end surface of engagement between a clutch gear and an inner spline due to accuracy of the angle chamfer form.

In the gear for a transmission according to the first embodiment, the taper part 14 is formed on more than half of the inner peripheral wall surface of the annularly-shaped concave portion 12. Therefore, the gear for a transmission according to the first embodiment has an advantage such that it is able to secure a desired torque capacity, because the taper part 14 secures a desired pressurized area. Moreover, the gear for a transmission according to the first embodiment has an advantage such that there is no increase in an axial length and it is able to shorten the axial length because the taper part 14 is formed in the annularly-shaped concave portion 12.

In the gear for a transmission according to the first embodiment, the axial end part of the outer peripheral side part 11 of the main body of the gear 10 projects more than the axial end surface of the central side part 15 of the main body of the gear. Therefore, the gear for a transmission according to the first embodiment has an advantage such that it is able to secure an area of the taper part 14 comprising the inner corn for a synchro or synchronizer ring, formed on the inner peripheral surface 121 comprising the annularly-shaped concave portion 12.

Furthermore, in the gear for a transmission according to the first embodiment, the radial grooves 141 for lubrication formed in an axial direction and at an each pre-determined angle of circumference on the taper part 14 concaving a part of the taper part 14 are formed by forging process. Therefore, the gear for a transmission according to the first embodiment has an advantage such that it is able to provide lubrication oil evenly all over the taper part 14.

Second Embodiment

Figure 6:
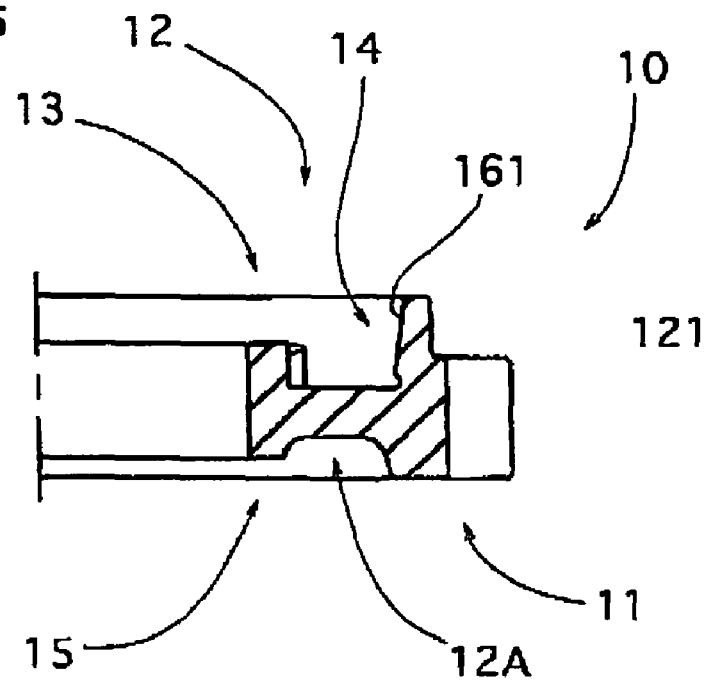
FIG. 6 is a cross section diagram showing half of the gear for a transmission according to the second embodiment of the present invention.

In the gear for a transmission according to the second embodiment, the outer peripheral gear part 11 formed on the outer peripheral surface of the main body of the gear 10, the annularly-shaped concave portion 12 annularly formed at a radial inner part on at least one axial end surface of the main body of the gear 10 within the outer peripheral gear part 11 thereof, the annularly-shaped projected portion 16 projected in an axial direction in order to form the inside peripheral wall surface for extending the inside peripheral wall surface 121 of the annular-shaped concave portion provided at the outer peripheral side surface of the main body of the gear, the dog gear part 13 formed on the outer peripheral wall surface of the central part 15 formed on the annularly-shaped concave portion 12, and the taper part 14 comprising the inner corn for a synchro or synchronizer ring, formed on the inside peripheral wall surface formed on the annularly-shaped projected portion 16 and the inside peripheral wall surface 121 of the annularly-shaped concave portion 12 are integrally formed by forging, as shown in FIG. 6 and FIG. 7. The second embodiment will be described with a focus on a difference between the second embodiment and the first embodiment and a description of the same part will be abbreviated.

In the method for manufacturing the gear for a transmission according to the second embodiment, the outer peripheral gear part 11 formed on the outer peripheral surface of the main body of the gear 10, the annularly-shaped concave portion 12 annularly formed at a radial inner part on at least one axial end surface of the main body of the gear 10 within the outer peripheral gear part 11 thereof, the annularly-shaped projected portion 16 in an axial direction in order to form the inner peripheral wall surface 161 for extending the inside peripheral wall surface 121 provided at an outer peripheral side thereof, the annularly-shaped concave portion 12, the dog gear part 13 formed on the outside peripheral wall surface 122 of the central part 15 formed on the annularly-shaped concave portion 12, and the taper part 14 comprising the inner corn for a synchro or synchronizer ring, formed on the inside peripheral wall surface 161 formed on the annularly-shaped concave portion and the inside peripheral wall surface 121 of the annularly-shaped concave portion 12 are integrally formed by hot forging, as shown in FIG. 7B.

In the gear for a transmission of the second embodiment having the above described construction, the outer peripheral gear part 11 formed on the outer peripheral surface of the main body of the gear 10, the annularly-shaped concave portion 12 annularly formed at a radial inner part on at least one axial end surface of the main body of the gear 10 within the outer peripheral gear part 11 thereof, the annularly-shaped projected portion 16 in an axial direction in order to form the inner peripheral wall surface 161 for extending the inside peripheral wall surface 121 provided at an outer peripheral side thereof, the annularly-shaped concave portion 12, the dog gear part 13 formed on the outside peripheral wall surface 122 of the central part 15 formed on the annularly-shaped concave portion 12, and the taper part 14 comprising the inner corn for a synchro or synchronizer ring, formed on the inside peripheral wall surface 161 formed on the annularly-shaped concave portion and the inside peripheral wall surface 121 of the annularly-shaped concave portion 12 are integrally formed by hot forging. Therefore, the gear for a transmission according to the second embodiment has an advantage such that it is able to attain stable intensity of the gear for a transmission, simplify the method for manufacturing the gear for a transmission and lower costs because there is no need to handle difficult cutting process. Moreover, the gear for a transmission according to the second embodiment has an advantage such that it is able to eliminate restrictions on the design of the each part of the gear because there is no restriction on cutting process.

In the gear for a transmission according to the second embodiment, the taper part 14 comprising the inner corn for a synchro or synchronizer ring, formed on the inside peripheral wall surface 121 of the annularly-shaped concave portion 12 and the inner peripheral wall surface 161 formed on the annularly-shaped projected portion. Therefore, the gear for a transmission according to the second embodiment has an advantage such that it is able to obtain a large pressurized area more than the above described first embodiment and upgrade a torque capacity.

In the method for manufacturing the gear for a transmission according to the second embodiment, the outer peripheral gear part 11 formed on the outer peripheral surface of the main body of the gear 10, the annularly-shaped concave portion 12 annularly formed at a radial inner part on at least one axial end surface of the main body of the gear 10 within the outer peripheral gear part 11 thereof, the annularly-shaped projected portion 16 projected in an axial direction in order to form the inside peripheral wall surface 161 for extending the inside peripheral wall surface 121 provided at the outer peripheral side thereof, on the annularly-shaped concave portion 12, the dog gear part 13 formed on the outside peripheral wall surface 122 of the central part 15 formed on the annularly-shaped concave portion 12, the taper part 14 comprising the inner corn for a synchro or synchronizer ring, formed on the inside peripheral wall surface 161 formed on the annularly-shaped projected portion 16 and the inner peripheral surface 121 comprising the annularly-shaped concave portion 12 are integrally formed by forging. Therefore, the method for manufacturing the gear for a transmission according to the second embodiment has an advantage such that it is able to attain stable intensity of the gear for a transmission, simplify the method for manufacturing the gear for a transmission and lower costs because there is no need to handle difficult cutting process. Moreover, the method for manufacturing the gear for a transmission according to the second embodiment has an advantage such that it is able to eliminate restrictions on the design of the each part of the gear because there is no restriction of cutting process.

Third Embodiment

Figure 8:
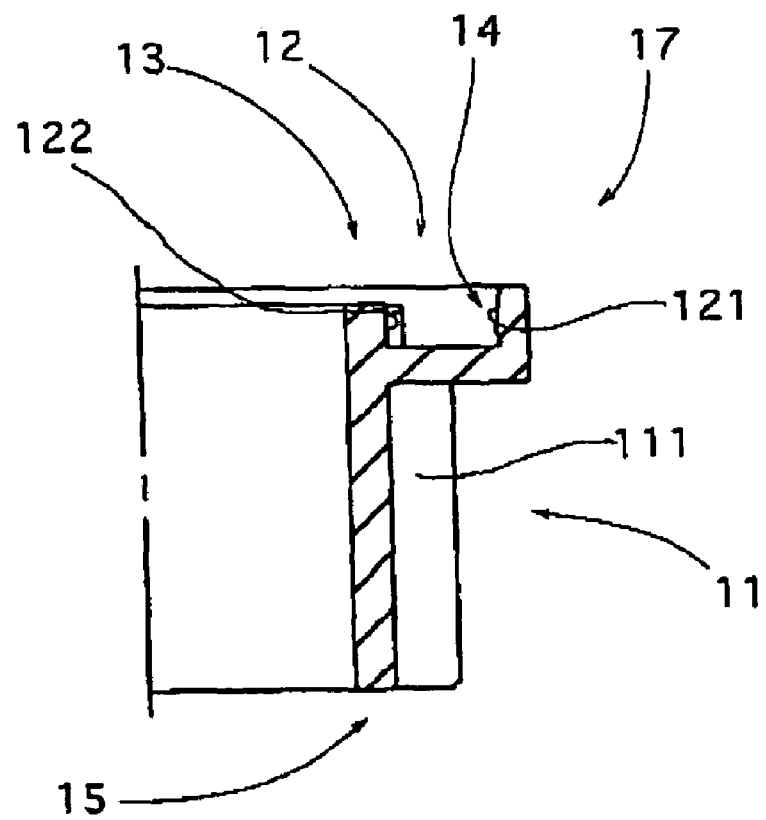
FIG. 8 is a cross section diagram showing half of the gear for a transmission according to the third embodiment of the present invention.

In the gear for a transmission according to the third embodiment, the outer peripheral gear part 11 formed on a part formed on an axial direction of an outer peripheral surface of a main body of a gear 10, a large diameter portion 17 having a larger diameter than that of the outer peripheral gear part 11 formed on an outer peripheral surface of the main body of the gear, an annularly-shaped concave portion annularly formed at a radial inner part of the large diameter portion 17 within an outer peripheral part on an axial end surface of the large diameter portion, a dog gear part 13 formed on an outside peripheral wall surface 122 at a central part 15 formed on the annularly-shaped concave portion 12, and the taper part 14 comprising an inner corn for a synchro or synchronizer ring, formed on an inside peripheral wall surface 121 having a larger diameter than that of the outer peripheral gear part 11, formed on the annularly-shaped concave portion 12 are integrally formed by forging, as shown in FIG. 8 and FIG.

9. The third embodiment will be described with focus on differences and a description of the same part will be abbreviated.

In the method for manufacturing the gear for a transmission according to the third embodiment, the outer peripheral gear part 11 formed on a part formed on an axial direction of the outer peripheral surface of the main body of the gear 10, a large diameter portion 17 having a larger diameter than that of the outer peripheral gear part 11 formed on the outer peripheral surface of the main body of the gear, the annularly-shaped concave portion annularly formed at a radial inner part of the large diameter portion 17 within an outer peripheral part on an axial end surface of the large diameter portion, the dog gear part 13 formed on the outside peripheral wall surface 122 at a central part 15 formed on the annularly-shaped concave portion 12, and a taper part 14 comprising an inner corn for a synchro or synchronizer ring, formed on an inside peripheral wall surface 121 having a larger diameter than that of the outer peripheral gear part 11, formed on the annularly-shaped concave portion 12 are integrally formed by forging, as shown in FIG. 9B.

In the third embodiment after cold forging against the dog gear part 13, as shown in FIG. 9C and FIG. 9D, an axial pre-determined part of the main body of the gear between the outer peripheral gear part 11 and the large diameter portion 17 is cut in radial inner direction, as shown in FIG. 9E.

In the gear for a transmission of the third embodiment having the above described construction, the outer peripheral gear part 11 formed on a part formed on an axial direction of the outer peripheral surface of the main body of the gear 10, the large diameter portion 17 having a larger diameter than that of the outer peripheral gear part 11 formed on the outer peripheral surface of the main body of the gear 10, the annularly-shaped concave portion 12 annularly formed at a radial inner part of the large diameter portion 17 within the outer peripheral part on an axial end surface of the large diameter portion 17, the dog gear part 13 formed on an outside peripheral wall surface 122 at the central part 15 formed on the annularly-shaped concave portion 12; and the taper part 14 comprising the inner corn for a synchro or synchronizer ring, formed on the inside peripheral wall surface 121 formed on the annularly-shaped concave portion are integrally formed by forging. Therefore, the gear for a transmission according to the third embodiment has an advantage such that it is able to attain stable intensity of the gear for a transmission, simplify the method for manufacturing the gear for a transmission and lower costs because there is no need to handle difficult cutting process. Moreover, the gear for a transmission according to the third embodiment has an advantage such that it is able to eliminate restrictions on the design of the each part of the gear because there is no restriction on cutting process.

In the gear for a transmission according to the third embodiment, the taper part 14 comprising the inner corn for a synchro or synchronizer ring, formed on the inside peripheral wall surface 121 formed on the annularly-shaped concave portion 12 annularly formed at a radial inner part of the large diameter portion 17 within the outer peripheral part on an axial end surface of the large diameter portion 17 is located outer than the outer peripheral gear part 11 in a radial direction. Therefore, the gear for a transmission according to the third embodiment has an advantage such that it is able to upgrade the torque capacity.

In the method for manufacturing the gear for a transmission according to the third embodiment, the outer peripheral gear part 11 formed on the part formed on an axial direction of the outer peripheral surface of the main body of the gear, the large diameter portion 17 having a larger diameter than that of the outer peripheral gear part 11 formed on the outer peripheral surface of the main body of the gear, the annularly-shaped concave portion 12 annularly formed at the radial inner part of the large diameter portion 17 within the outer peripheral part on the axial end surface of the large diameter portion 17, the dog gear part 13 formed on the outside peripheral wall surface 122 at the central part 15 formed on said annularly-shaped concave portion 12, and the taper part 14 comprising an inner corn for a synchro or synchronizer ring, formed on the inside peripheral wall surface formed on said annularly-shaped concave portion 12, are integrally formed by forging. Therefore, the method for manufacturing the gear for a transmission according to the third embodiment has an advantage such that it is able to attain stable intensity of the gear for a transmission, simplify the method for manufacturing the gear for a transmission and lower costs because there is no need to handle difficult cutting process. Moreover, the method for manufacturing the gear for a transmission according to the third embodiment has an advantage such that it is able to eliminate restrictions on the design of the each part of the gear because there is no restriction on cutting process.

The preferred embodiments of the present invention, as herein disclosed, are taken as some embodiments for explaining the present invention. It is to be understood that the present invention should not be restricted by these embodiments and any modifications and additions are possible so far as they are not beyond the technical idea or principle based on descriptions of the scope of the patent claims.

In the above described second embodiment, as an example, the taper part 14 comprising the inner corn for a synchro or synchronizer ring, formed on the inside peripheral wall surface 161 formed on the annularly-shaped projected portion 16 and the inside peripheral wall surface 121 formed on the annularly-shaped concave portion 12 to secure a large pressurized area. It is to be understood that the present invention should not be restricted by these embodiments and such embodiment that the taper part 14 is formed on only the inside peripheral wall surface 161 formed on the annularly-shaped projected portion 16 projecting upward, can be adopted.

In the above described embodiment, as an example, the outer peripheral gear is formed on the outside peripheral wall surface of the outer peripheral gear part by gear cutting. It is to be understood that the present invention should not be restricted by these embodiments and such embodiment, for example, that the outer peripheral gear is formed by cold forging can be adopted.

Figure 10:
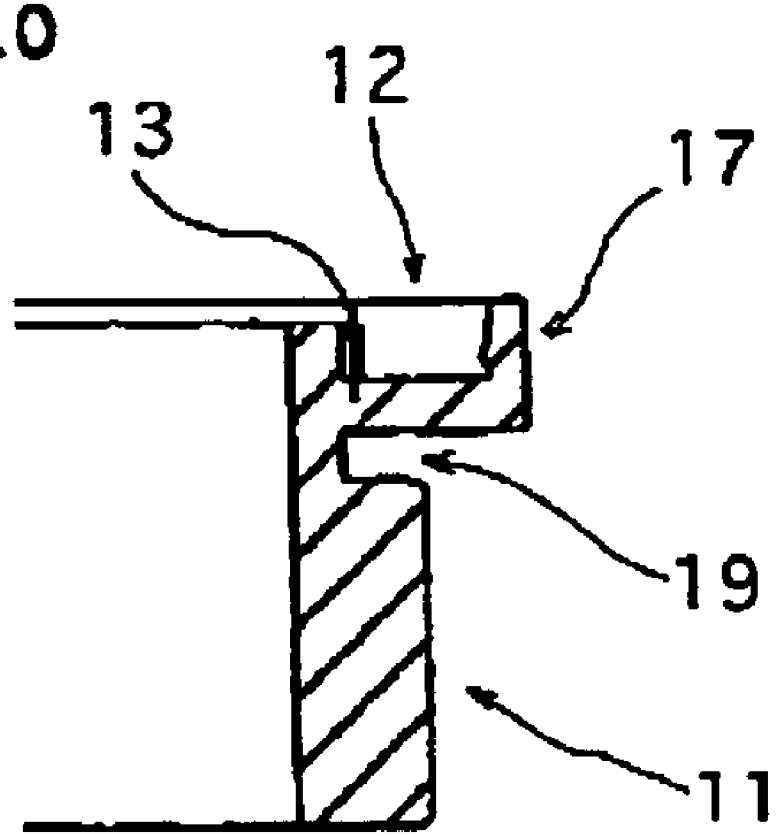
FIG. 10 is a cross section diagram showing the concave portion formed in the modified embodiment of the third embodiment.

In the above described embodiment, as an example, the outer peripheral gear part 11 and the large diameter part 17 of the outer peripheral part of the main body of the gear, the taper part comprising the inner corn for a synchro or synchronizer ring, formed having continuously. It is to be understood that the present invention should not be restricted by these embodiments and such modification that in cutting process carried out before gear cutting against the outer peripheral part, a constriction portion 19 is formed by cutting inwardly in the radial direction a part of the main body of the gear between the outer peripheral gear part 11 and the large diameter part 17 in radial direction, as shown in FIG. 10.

What is claimed is:

1. A gear for a transmission, comprising:
   an outer peripheral gear part formed by forging on an outer peripheral wall surface of a main body of a gear;
   an annularly-shaped concave portion annularly formed by forging at a radial inner part on at least one axial end surface of said main body of said gear, within said outer peripheral gear part thereof;

a dog gear part formed by forging on an outside peripheral wall surface at a central part formed on said annularly-shaped concave portion;

a taper part comprising an inner corn for a synchronizer ring formed by forging on an inside peripheral wall surface formed on said annularly-shaped concave portion, and wherein said outer peripheral gear part, said annularly-shaped concave portion, said dog gear part and said taper part are formed integrally, and an outer peripheral gear is formed on said outer peripheral gear part thereof by gear cutting, and wherein an axial end part of an outer peripheral side part of said main body of said gear projects more than an axial end surface of a central side part of said main body of said gear.

2. A gear for a transmission according to claim 1, wherein said axial end part of said outer peripheral side part of said main body of said gear is higher than said axial end surface of a central side part of said main body of said gear.

3. A gear for a transmission according to claim 2, wherein a position of said dog gear part formed on said outside peripheral wall surface at said central part thereof is lower than that of said taper part formed on said inside peripheral wall surface of said annularly shaped concave portion.

4. A gear for a transmission, comprising:

an outer peripheral gear part formed by forging on an outer peripheral wall surface of a main body of a gear;

an annularly-shaped concave portion annularly formed by forging at a radial inner part on at least one axial end surface of said main body of said gear, within said outer peripheral gear part thereof;

a dog gear part formed by forging on an outside peripheral wall surface at a central part formed on said annularly-shaped concave portion;

a taper part comprising an inner corn for a synchronizer ring formed by forging on an inside peripheral wall surface formed on said annularly-shaped concave portion, and wherein said outer peripheral gear part, said annularly-shaped concave portion, said dog gear part and said taper part are formed integrally, and an outer peripheral gear is formed on said outer peripheral gear part thereof by gear cutting, and wherein radial grooves for lubrication formed in an axial direction and at an each pre-determined angle of circumference on said taper part are formed by forging process.

5. A gear for a transmission, comprising:

an outer peripheral gear part formed by forging on an outer peripheral surface of a main body of a gear;

an annularly-shaped concave portion annularly formed by forging at a radial inner part on at least one axial end surface of said main body of said gear within said outer peripheral gear part thereof;

an annularly-shaped projected portion projected by forging in an axial direction in order to form an inside peripheral wall surface for extending an inside peripheral wall surface provided at an outer peripheral side thereof, on said annularly-shaped concave portion;

a dog gear part formed by forging on an outside peripheral wall surface at a central part formed on said annularly-shaped concave portion; and a taper part comprising an inner corn for a synchronizer ring formed by forging on an inside peripheral wall surface formed on said annularly-shaped concave portion and on an inside peripheral wall surface of said annularly-shaped projected portion, and wherein said outer peripheral gear part, said annularly-shaped concave portion, said dog gear part and said taper part are formed integrally, and an outer peripheral gear is formed on said outer peripheral gear part thereof by gear cutting, and wherein an axial end part of an outer peripheral side part of said main body of said gear projects more than an axial end surface of a central side part of said main body of said gear.

6. A gear for a transmission, comprising:

an outer peripheral gear part formed by forging on a part formed on an axial direction of an outer peripheral surface of a main body of a gear;

a large diameter portion having a larger diameter than that of said outer peripheral gear part formed by forging on an outer peripheral surface of said main body of said gear;

an annularly-shaped concave portion annularly formed by forging at a radial inner part of said large diameter portion within an outer peripheral part on an axial end surface of said large diameter portion;

a dog gear part formed by forging on an outside peripheral wall surface at a central part formed on said annularly-shaped concave portion; and a taper part comprising an inner corn for a synchronizer ring formed on an inside peripheral wall surface formed on said annularly-shaped concave portion, and wherein said outer peripheral gear part, said annularly-shaped concave portion, said dog gear part and said taper part are formed integrally, and an outer peripheral gear is formed on said outer peripheral gear part thereof by gear cutting, and wherein an axial end part of an outer peripheral side part of said main body of said gear projects more than an axial end surface of a central side part of said main body of said gear.

7. A gear for a transmission, comprising:

an outer peripheral gear part formed by forging on an outer peripheral surface of a main body of a gear;

an annularly-shaped concave portion annularly formed by forging at a radial inner part on at least one axial end surface of said main body of said gear within said outer peripheral gear part thereof;

an annularly-shaped projected portion projected by forging in an axial direction in order to form an inside peripheral wall surface for extending an inside peripheral wall surface provided at an outer peripheral side thereof, on said annularly-shaped concave portion;

a dog gear part formed by forging on an outside peripheral wall surface at a central part formed on said annularly-shaped concave portion; and a taper part comprising an inner corn for a synchronizer ring formed by forging on an inside peripheral wall surface formed on said annularly-shaped concave portion and on an inside peripheral wall surface of said annularly-shaped projected portion, and wherein said outer peripheral gear part, said annularly-shaped concave portion, said dog gear part and said taper part are formed integrally, and an outer peripheral gear is formed on said outer peripheral gear part thereof by gear cutting, and wherein radial grooves for lubrication formed in an axial direction and at an each pre-determined angle of circumference on said taper part are formed by a forging process.

8. A gear for a transmission, comprising:
an outer peripheral gear part formed by forging on a part formed on an axial direction of an outer peripheral surface of a main body of a gear;
a large diameter portion having a larger diameter than that of said outer peripheral gear part formed by forging on an outer peripheral surface of said main body of said gear;
an annularly-shaped concave portion annularly formed by forging at a radial inner part of said large diameter portion within an outer peripheral part on an axial end surface of said large diameter portion;
a dog gear part formed by forging on an outside peripheral wall surface at a central part formed on said annularly-shaped concave portion; and
a taper part comprising an inner corn for a synchronizer ring formed on an inside peripheral wall surface formed on said annularly-shaped concave portion, and wherein
said outer peripheral gear part, said annularly-shaped concave portion, said dog gear part and said taper part are formed integrally, and
an outer peripheral gear is formed on said outer peripheral gear part thereof by gear cutting, and wherein
radial grooves for lubrication formed in an axial direction and at an each pre-determined angle of circumference on said taper part are formed by forging process.

9. A gear for a transmission, comprising:
an outer peripheral gear part formed by forging on an outer peripheral surface of a main body of a gear;
an annularly-shaped concave portion annularly formed by forging at a radial inner part on at least one axial end surface of said main body of said gear within said outer peripheral gear part thereof;
a dog gear part formed by forging on an outside peripheral wall surface at a central part formed on said annularly-shaped concave portion; and
a taper part comprising an inner corn for a synchronizer ring formed on an inside peripheral wall surface formed on said annularly-shaped concave portion and on an inside peripheral wall surface of said annularly-shaped projected portion, and wherein
said outer peripheral gear part, said annularly-shaped concave portion, said dog gear part and said taper part are formed integrally, and
an outer peripheral gear is formed on said outer peripheral gear part thereof by gear cutting, and wherein
an axial end part of an outer peripheral side part of said main body of said gear projects more than an axial end surface of a central side part of said main body of said gear, and wherein
the axial length of said dog gear part formed on said outside peripheral wall surface at said central part thereof is shorter than that of said taper part formed on said inside peripheral wall surface of said annularly-shaped concave portion.

10. A gear for a transmission, comprising:
an outer peripheral gear part formed by forging on an outer peripheral wall surface of a main body of a gear;
an annularly-shaped concave portion annularly formed by forging at a radial inner part on at least one axial end surface of said main body of said gear, within said outer peripheral gear part thereof;
a dog gear part formed by forging on an outside peripheral wall surface at a central part formed on said annularly-shaped concave portion;
a taper part comprising an inner corn for a synchronizer ring formed by forging on an inside peripheral wall surface formed on said annularly-shaped concave portion, and wherein
said outer peripheral gear part, said annularly-shaped concave portion, said dog gear part and said taper part are formed integrally, and
an outer peripheral gear is formed on said outer peripheral gear part thereof by gear cutting, wherein said outer peripheral gear part, said annularly-shaped concave portion, said dog gear part, and said taper part are integrally formed by a hot forging, and
wherein radial grooves for lubrication formed in an axial direction and at an each predetermined angle of circumference on said taper part are formed by hot forging.

11. A gear for a transmission according to claim 10, wherein
a gear part form on said dog gear part is formed in a first cold forging.

12. A gear for a transmission according to claim 11, wherein
a back taper form and a chamfer form of said gear part on said dog gear part are formed in a second cold forging.

13. A gear for a transmission, comprising:
an outer peripheral gear formed by hot forging on an outer peripheral wall surface of a main body of a gear;
an annularly-shaped concave portion annularly formed by hot forging at a radial inner part on at least one axial end surface of said main body of said gear, within said outer peripheral gear part thereof;
a dog gear part formed by hot forging on an outside peripheral wall surface at a central part formed on said annularly-shaped concave portion;
a taper part comprising an inner corn for a synchronizer ring formed by hot forging on an inside peripheral wall surface formed on said annularly-shaped concave portion, and wherein
said outer peripheral gear part, said annularly-shaped concave portion, said dog gear part and said taper part are formed integrally, and
a form of a gear part on said dog gear part and an outer peripheral gear on said outer peripheral gear part thereof are formed by cold forging, and wherein
an axial end part of an outer peripheral side part of said main body of said gear projects more than an axial end surface of a central side part of said main body of said gear.

14. A gear for a transmission according to claim 13, wherein
a back taper form and a chamfer form of said gear part on said dog gear part are further formed by cold forging.

* * * * *

UNITED STATES PATENT AND TRADEMARK OFFICE
CERTIFICATE OF CORRECTION

PATENT NO. : 7,490,529 B2 Page 1 of 1
APPLICATION NO. : 10/834922
DATED : February 17, 2009
INVENTOR(S) : Okada et al.

It is certified that error appears in the above-identified patent and that said Letters Patent is hereby corrected as shown below:

On the title page, Item (75), the first Inventor's information is incorrect. Item (75) should read:

Item -- (75) Inventors: Tomoyoshi Okada, Nagoya (JP);
Mitsushige Ooka, Nagoya (JP);
Junichi Ooka, Nagoya (JP) --

Signed and Sealed this

Twenty-first Day of April, 2009

JOHN DOLL
*Acting Director of the United States Patent and Trademark Office*